United States Patent [19]

Lissy

[11] 4,409,009
[45] Oct. 11, 1983

[54] POWDER SPRAY BOOTH

[75] Inventor: Gunter J. Lissy, Amherst, Ohio

[73] Assignee: Nordson Corporation, Amherst, Ohio

[21] Appl. No.: 214,192

[22] Filed: Dec. 8, 1980

Related U.S. Application Data

[63] Continuation-in-part of Ser. No. 962,507, Nov. 20, 1978, abandoned.

[51] Int. Cl.$^3$ .............................................. B01D 46/36
[52] U.S. Cl. ......................................... 55/302; 55/431;
 118/326; 118/634; 118/DIG. 7; 118/603
[58] Field of Search .................. 118/634, 326, DIG. 7, 118/312, 603, 610; 55/302, 431; 98/115 SB

[56] References Cited

U.S. PATENT DOCUMENTS

| | | | |
|---|---|---|---|
| 2,759,449 | 8/1956 | Lindquist | 118/312 X |
| 3,791,341 | 2/1974 | Diamond et al. | 118/634 X |
| 4,218,227 | 8/1980 | Frey | 55/302 |
| 4,260,400 | 4/1981 | Scalet | 118/634 X |

OTHER PUBLICATIONS

SFB Brochure, M. Ofner GmbH & Co. KG, 1978.

*Primary Examiner*—John P. McIntosh
*Attorney, Agent, or Firm*—Wood, Herron & Evans

[57] ABSTRACT

A spray booth is disclosed for applying powder coating to substrates. There is a self contained recovery/filter system located beneath the floor of the booth, which recovery/filter system is removably attached to the booth so that another recovery/filter system may be conveniently substituted when changing spray powders, or to facilitate cleaning or repair of the recovery system. The recovery/filter system is so constructed that there are no restrictions in the air flow passages between the booth and the recovery/filter system, with the result that there are no confined areas wherein fires may cause explosions. Powder is collected in the hoppers located in the bottom of the recovery/filter system. The hoppers are generally funnel shaped and are open at the bottom to air transfer pumps which recycle the powder back to the spray system. Vibrators mounted upon the hoppers periodically vibrate the hopper walls to prevent powder from collecting on the walls. A vibration damping gasket is located between the powder collection hoppers and the remainder of the powder recovery system so as to prevent the vibrations of the hoppers from being transferred from the hoppers into the booth and to the remainder of the powder recovery system.

4 Claims, 3 Drawing Figures

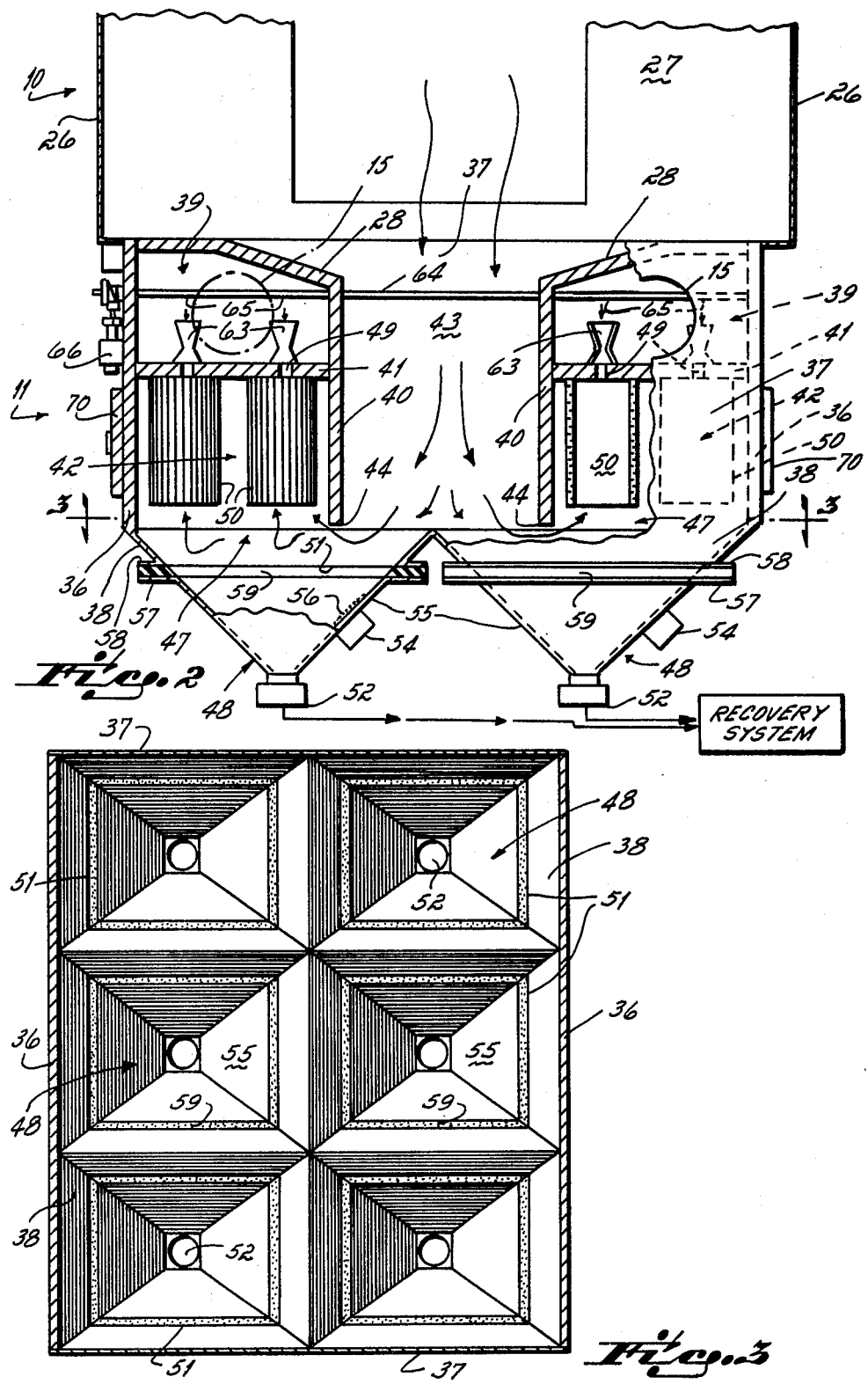

POWDER SPRAY BOOTH

This application is a Continuation-in-Part of application Ser. No. 962,507, filed Nov. 20, 1978 and assigned to the assignee of the application, now abandoned.

This invention relates generally to the powder coating art, and more particularly relates to a powder spray booth and powder recovery system.

In the practice of powder coating, a powdered resin is applied to a substrate, and then the substrate and powder are heated so that the powder melts and when subsequently cooled, forms a solid continuous coating on the substrate. The powder is generally sprayed onto the substrate. An electrostatic charge is generally applied to the sprayed powder so as to enhance the quantity of powder which attaches to the substrate and to assist in retaining the powder on the substrate. These electrostatic powder spraying techniques are well known and widely practiced commercially.

By and large, powder deposition is performed in a booth, a controlled area wherein any oversprayed powder which is not deposited on the substrate is collected. Conventionally, the containment of the powder in the booth is aided by an exhaust system which creates a negative pressure within the booth and causes the oversprayed powder to be drawn out of the booth to powder recovery filtering devices. In some systems, the oversprayed powder is collected and is merely saved for future use, while in others it is recycled automatically to the application device. In very nearly all powder spray applications though, the oversprayed material must be collected and recycled since it generally represents substantially more than half of the sprayed material.

Collection of the oversprayed material generally involves entraining the oversprayed powder in an air stream withdrawn from the powder booth, conveying that powder entrained air stream to a powder recovery system and there separating the powder from the air. Commonly, the separation is effected by some form of filter or cyclone separation.

One of the most critical aspects of all powder recovery systems is that of avoiding explosions of the powder conveying and recovery equipment. Very nearly all burnable powders, when entrained in air in burnable concentrations, are subject to burning and explosion and powdered resins or paints are no exception. The powder spray booth of this invention eliminates explosion hazards by venting the powder recovery system and the powder collection chamber of the system back into the spray booth without any substantial air flow restrictions between the powder collection chamber and the spray booth. Consequently, if a fire does occur in the spray booth, and spread to the powder recovery chamber, there is no opportunity for an explosion because there is no place within the system for a pressure build up and consequent explosion.

The powder spray booth of this invention collects oversprayed powder in an air stream withdrawn from the bottom of the booth and then turned and conveyed upwardly through a filter chamber to a clean air chamber. Beneath the filter chamber there are funnel shaped hoppers within which the oversprayed powder is collected and pumped to a recycle system.

There has been a problem with powder spray booths of this type because of the difficulty of moving the powder from the collection hopper into the powder pump. Often times, and particularly when spraying high density powders, the powder collects and builds on the walls of the hoppers rather than falling by gravity or being drawn into the powder pump. To overcome this problem, the invention of this application incorporates a vibrator attached to the wall of each hopper. This vibrator is periodically activated so as to shake down powders from the hopper walls. Another problem encountered when a vibrator was added to the walls of the hopper was that the vibrator shook the booth so violently as to damage the booth. This problem has been overcome by insertion of a vibration damping gasket between the walls of the hopper and the walls of the collection/filter system so as to isolate the vibration of the hopper from the remainder of the system.

In general then, this invention provides an improved spray booth/recovery system which provides improved safety relative to prior art systems and which overcomes the problem of powder collecting upon the walls of the hopper of the recovery system.

The improved powder spray booth which accomplishes these objectives comprises a spray booth having an attached powder recovery system which in the preferred embodiment is located underneath the floor of the booth. The recovery system comprises a powder collection chamber below the booth, and a clean air chamber sealed from the booth and from the powder collection chamber, but being provided with an opening from the collection chamber into the clean air chamber through static filters. A blower is provided to create negative pressure in the chamber so that powder laden air is drawn down through the opening in the floor of the booth into the collection area immediately below the booth, and thence upward through filters to the clean air chamber. This filtered air having only traces of fine powder in a non-explosive ratio, is withdrawn fom the clean air chamber through the blower, and passed to an absolute filter for final filtering.

The powder collection chamber is open to the interior of the spray booth through a relatively unrestricted opening so that any fire in the powder collection chamber is directly vented into the booth without any significant restriction therebetween. The powder collection chamber comprises a plurality of funnel shaped hoppers, the bottoms of which are open to powder pumps operating to pump the collected powder back to a recycle system. According to the practice of this invention, the hoppers have vibrators attached to their walls for vibrating powder down through the hoppers and into the powder pumps. The hoppers are isolated from the remainder of the powder recovery system by vibration damping gaskets so that vibration of the hoppers does not damage the remainder of the recovery system and/or the spray booths.

The primary advantage of this invention is that it more effectively and safely collects and recycles powders and particularly high density powders which have heretofore presented collection problems.

These and other objects and advantages of this invention will be more readily apparent from a description of the drawings in which:

FIG. 2 is a fragmentary end elevational view of the interior construction of the recovery/collection system of the booth of FIG. 1.

FIG. 3 is a cross sectional view taken on line 3—3 of FIG. 2.

Figure 1:
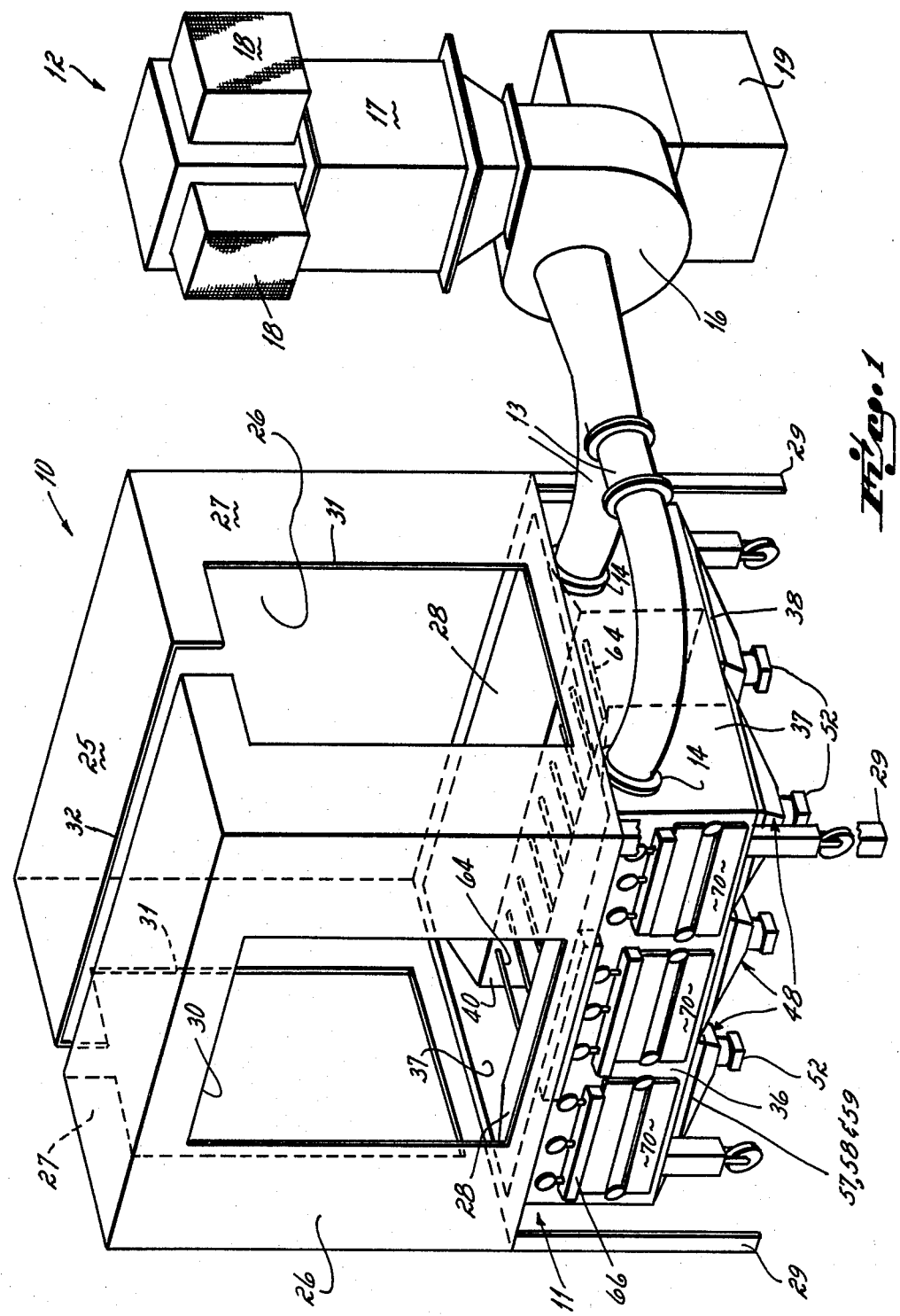
FIG. 1 is a perspective view of a spray coating booth having a recovery/collection system in accordance with the invention of this application.

Referring first to FIG. 1, a system incorporating the invention of this application comprises a spray booth 10 having a base 11, which comprises the filter/recovery system for the powder, and an absolute filter 12 connected to the base 11 through ductwork 13. The ductwork 13 connects on either side of one end of the base 11 by means of quick-disconnect connections 14 to holes 15 (see FIG. 2) in the base. This ductwork 13 communicates the interior of the base 11 to a blower 16 which creates a negative pressure in the base 11 as will be more fully discussed later. The blower 16 exhausts into a plenum 17 having filters 18 which clean any air discharged therethrough. The blower 16 can be mounted on a base 19 for convenience.

The spray booth 10 defines a controlled area for spraying powder and comprises generally a ceiling portion 25, opposed side wall portions 26, opposed end walls 27 and a floor area 28. The floor area 28, in this embodiment, actually comprises the top of the base or recovery/collector unit 11 and hence the two elements are designated by a common reference numeral herein. The booth 10 is supported by legs 29 over the base 11. Openings are provided in one of the side walls 26 of the booth 10 and both end walls 27. The opening 30 in one side wall 26 provides access into the interior of the booth 10 for spraying equipment, or for access for a man to enter the booth himself. Openings 31 are provided in each end wall 27 for product to be transported through the booth 10 for spraying. A slot 32 in the ceiling portion 25 of the booth allows the passage of conveyor hooks or the like from an overhead conveyor (not shown) to carry the articles to be coated (not shown) through the booth 10.

Referring now to FIGS. 2 and 3, the details of the base or recovery/filter unit 11 of the booth 10 can be seen.

The base 11 is generally comprised of opposed exterior side walls 36, end walls 37, the upper wall 28, and a bottom wall 38. As noted above, the upper wall 28 also forms the floor of the booth. Along each of the opposed side walls 36 of the base 11 is a clean air chamber 39 below the floor 28 of the booth 10, defined between part of an exterior side wall 36 of the base, the upper wall 28 of the base, part of an inner side wall 40 and a bottom chamber wall 41. Filter chambers 42 are located below these clean air chambers 39, the chambers 42 being defined by the walls 36, 37, 40 and 41.

The holes 15 in one end wall 37 connect each clean air chamber 39 to the ductwork 13 (see FIG. 1), so that a negative pressure may be created in the clean air chamber 39.

The interior side wall 40 extends downwardly from the floor 28 and forms a centrally located air flow passage 43 directly from the booth to a powder collection chamber 47. The powder collection chamber includes the area within six powder collection hoppers 48. The centrally located air flow passage 43 is elongated in the direction of travel of the articles to be coated and extends across the whole length of the booth 10. It is of substantial cross sectional area so as not to present a restriction which would result in a "confined area" subject to explosion.

Each clean air chamber 39 is provided with multiple holes 49 on the underside through the bottom walls 41. Each of these holes 49 is capped by a static cartridge type filter 50. The filters 50 can be removably attached to the chamber 39 by any suitable means. In this embodiment the holes in the bottom wall 41 of the clean air chamber 39, and associated filter elements 50, are arranged in three banks of six filters on each side of the unit so that there is a total of 18 filters on each side, 36 filters in all. In the plane of FIG. 2, four filters 50 can be seen, two on each side.

Below each of the six banks of filters, the bottom 38 of the base 11 tapers downward into six openings 51. Each of these openings 51 is capped by a funnel or pyramid shaped hopper 48 within which oversprayed powder or powder filtered out of the air by the filters 50 is collected. At the bottom or apex of each hopper 48 is a venturi pump 52 or other suitable means to receive the powder from the hopper and to transport the collected powder to a recycling system which may be in the form of a storage bin or may be directed back to the spray gun from which the powder was originally ejected into the booth.

A vibrator 54 is attached to one side wall 55 of each powder collection hopper 48. The vibrator functions to periodically vibrate and shake collected powder 56 from the walls of the hopper 48 downwardly into the powder pump 52. In the absence of these vibrators, many powders and particularly high density powders tend to collect on the walls of the hoppers rather than to fall downwardly into the powder pump.

The funnel shaped hoppers 48 are each provided around their upper edges with a laterally extending flange 57, which flange is secured by bolts (not shown) to a correspondingly shaped flange 58 which extends outwardly from the bottom openings 51 of the base 11. Between the flanges 57 of the hopper and the flanges 58 of the base 11, there are heavy resilient gaskets which function to isolate vibrations of the hopper from the powder recovery system 11 and from the powder spray booth 10.

Interiorly of the clean air chamber 39, venturi throats 63 are situated above and around each of the holes 49 through which filtered air passes. A series of pipes 64 extend across the base 11, one each in alignment with all four of the venturi throats 63, and hence the filters 50, across in a row. Each of the pipes 64 has four holes (as at 65) in its underside which are aligned one each with a respective venturi throat 63. An air solenoid 66 associated with each pipe 64 and mounted exteriorly of one outside wall 36 is effective to discharge a 15 to 20 millisecond burst of air into a respective pipe 64, and thus out of the holes 65 in the underside of the pipe 64 into each venturi throat 63. The burst causes momentary reverse air flow through the filters 50, and dislodges collected powder from the filter material. The dislodged powder falls into a respective hopper 48. The solenoids 66 are sequentially operated through any suitable control mechanism well known in the art, so that only one bank or row is cleaned at a time. Therefore, there is no net interruption of the air flow through the filter/collector unit 11.

Access doors 70 are mounted on the exterior side walls 36 for servicing or replacing the filters 50. The whole base 11 is mounted on wheels 71 to allow the base 11 to be easily removed from underneath the spray booth 10, so that a new base 11 can be substituted therefor in order to facilitate the spraying of a new powder or color, or to service the unit.

It should be noted that the quantity or type of filter 50 is selected in this embodiment to achieve improved filter cleaning capabilities. It has been noted that the velocity of powder burdened air penetrating the filters 50 is directly related to the total surface area of a filter or banks of filters 50. An increased filter surface area was found to be particularly desirable to reduce powder penetration into the filtering elements of the filters 50 because the velocity of the air across the filter medium was substantially reduced. This facilitates cleaning by blow-back or reverse air flow as hereinbefore described. Also the reduced velocity achieved by increased surface area of the filters 50 minimizes the amount of powder that returns to the surface of each filter 50 after a reverse air burst. The filters 50 individually and collectively thus operate more efficiently while minimizing powder build-up in the filtering area. Overall air flow through the collection chamber is thus maintained. In turn the efficiency of the fan or blower 16 is sustained along with that of the overall booth 10. In this particular embodiment, each of the numbers and type of filters is selected so that the velocity of the air passing therethrough is about 1.8 feet per minute for an air flow through the booth 1 and fan 4 of about 1.8 cubic feet per minute.

In operation of the booth 10 and powder recovery unit 11, the blower 16 is first activated so as to create a negative pressure in the clean air chamber 39 and therby cause air flow inwardly from outside the booth through the side wall opening 30, end wall openings 31, and conveyor opening 32 at the top of the booth. This air flow, after passing through the booth, flows downwardly through the floor of the booth via central air flow passage 43, around the bottom 44 of the interior side walls 40, and into the powder collection areas 47. The air flow then is caused to change in direction from the generally downward direction in which it is moving as it flows past the bottom edge 44 of the side walls 40 into an upwardly directed air flow into the filter chambers 42 through the filters 50, and into the clean air chambers 39. The clean air is then caused to flow through the ductwork 13 to and through the absolute filter 12 wherein any residual powder which has passed through the filter 50 is extracted. The filter cartridges 50 are generally effective to extract more than 99% of the powder entering the powder recovery system 11 so that very little powder reaches the filters 18 of the absolute filter 12. Clean air is then exhausted from the absolute filter 12 back into the plant or to atmosphere.

As soon as the air flow is initiated by the blower 16, the powder may be turned on and sprayed via a gun or any other conventional applicator into the booth and onto parts (not shown) as the parts are conveyed through the booth. Conventionally, the powder particles are charged with a very high voltage electrostatic charge and the parts are grounded. The electrostatic charge increases the percentage of powder deposited onto the parts and assists in retaining those particles on the parts. All oversprayed powder is maintained in the booth via the incoming air flow through the booth openings. The oversprayed material either falls by gravity to the bottom of the booth or becomes entrained in the air flow moving downwardly in the booth into the central air flow passage 43. Most of the powder entering that passage 43 falls by gravity to the bottom of one of the collection hoppers 48. A substantial portion of the airborne remainder of powder is caused by a combination of gravity and centrifugal force to fall out of the air and collect in the bottom of the collection hoppers 48 as the air flow is changed from a generally downward direction in the center chamber 43 to an upward direction into the filters 50. A small percentage of the powder collects on the exterior of the filter cartridges 50 and that surface collected powder is periodically removed from the surfaces by reverse burst of air flow through the air flow pipes 64 and holes 65 as was explained hereinabove. That short burst of reverse air flow, which burst is on the order of a fraction of a second in duration, causes any powder adhered to the cartridge to be dislodged and fall to the bottom of the collection hoppers 48. From the bottom of the collection hoppers, the powder is pumped by pump 52 to a powder recovery system as is conventional in this art.

Often times the powder contained within the hopper 48 tends to adhere or stick to the walls 55 of the hopper 48 rather than to fall or flow freely into the pumps 52. The vibrators 54 are periodically activated so as to break that adhesion and to cause the powder to flow into the pumps. In one preferred embodiment in which the sprayed powder was a relatively high density grit, pulsing of the vibrators once every ten seconds was found to be effective to maintain the flow of powder through the hoppers to the pumps 52.

While I have described only a single preferred embodiment of the invention, persons skilled in this art will appreciate other changes and modifications which may be made without departing from the spirit of my invention. As an example, those persons will appreciate that the shape of the booth and the location of the recovery system relative to the booth exhaust vent may be varied without departing from the spirit of my invention. Therefore, I do not intend to be limited except by the scope of the following appended claims.

I claim:

1. A powder spray booth and powder recovery/static cartridge filter unit configuration comprising:

booth means providing a controlled area in which to powder coat substrates, defined generally by a ceiling, side and end walls, and a floor;

a powder collection chamber in close proximity to the booth;

means for removing collected powder from the bottom of said powder collection chamber, a clean air chamber sealed from the booth and from the powder collection chamber, said clean air chamber being provided with a multiplicity of individual openings from the powder collection chamber into said clean air chamber;

static filter means located within said powder collection chamber and operative to effectively prevent powder from entering said clean air chamber, said static filter means comprising a plurality of static filter cartridges, blower means operative to create a negative pressure in said clean air chamber;

means for cleaning powder from the surface of said filter cartridges by periodically and sequentially reversing air flow through selected filter cartridges while maintaining air flow from said powder collection chamber to said clean air chamber through the other of said filter cartridges so that there is no net interruption of the air flow from the powder collection chamber into the clean air chamber during the cleaning of said selected filter cartridges;

means for preventing a fire within said powder collection chamber from causing an explosion, said explosion prevention means including a substantially unrestricted flow path leading directly from said powder collection chamber into said booth operative to effectively vent any fire created pressure build-up within said powder collection chamber into said booth without the occurrence of an explosion;

means for periodically imparting vibrations to said walls of said powder collection chamber; and vibration dampening means for isolating said booth and said clean air chamber from vibrations imparted to said powder collection chamber.

2. The powder spray booth and powder recovery system of claim 1 in which said powder removing means comprises a venturi pump for transporting collected powder from the bottom of said hopper to a powder recycling system.

3. The powder spray booth and powder recovery unit of claim 1 in which the lower section of said powder collection chamber is generally funnel shaped.

4. The powder spray booth and powder recovery unit of claim 1 in which said vibration damping means comprises a vibration damping gasket located between said upper and lower sections of said powder collection chamber.

* * * * *